US011230363B2

(12) United States Patent
Klein

(10) Patent No.: US 11,230,363 B2
(45) Date of Patent: Jan. 25, 2022

(54) METHOD FOR TRANSFORMATION OF MOTOR TRANSPORTATION VEHICLE FOR GROUND AND AIR TRANSPORT, MOTOR TRANSPORTATION VEHICLE

(71) Applicant: Stefan Klein, Nitra (SK)

(72) Inventor: Stefan Klein, Nitra (SK)

( * ) Notice: Subject to any disclaimer, the term of this patent is extended or adjusted under 35 U.S.C. 154(b) by 271 days.

(21) Appl. No.: 16/610,047

(22) PCT Filed: May 10, 2018

(86) PCT No.: PCT/SK2018/050005
§ 371 (c)(1),
(2) Date: Oct. 31, 2019

(87) PCT Pub. No.: WO2018/208237
PCT Pub. Date: Nov. 15, 2018

(65) Prior Publication Data
US 2020/0055583 A1 Feb. 20, 2020

(30) Foreign Application Priority Data

May 11, 2017 (SK) .................................. 50035-2017

(51) Int. Cl.
*B64C 3/56* (2006.01)
*B60F 5/02* (2006.01)
(Continued)

(52) U.S. Cl.
CPC .................. *B64C 3/56* (2013.01); *B60F 5/02* (2013.01); *B64C 35/008* (2013.01); *B64C 37/00* (2013.01)

(58) Field of Classification Search
CPC ......... B64C 37/00; B64C 35/008; B64C 3/56; B60F 5/02
(Continued)

(56) References Cited

U.S. PATENT DOCUMENTS 3,759,629 A * 9/1973 Abramopaulos ....... B64C 27/12
416/20 R
5,050,817 A * 9/1991 Miller ...................... B60F 5/02
244/2
(Continued)

FOREIGN PATENT DOCUMENTS

CA      2918749 A1 *  4/2015   ........... B64C 35/008
CA      2948145 A1 * 11/2015   ................ B60F 5/02
(Continued)

OTHER PUBLICATIONS

International Search Report and Written Opinion of the International Searching Authority Application No. PCT/SK2018/050005 Completed: Jul. 13, 2018; dated Aug. 6, 2018 12 pages.

*Primary Examiner* — Christopher P Ellis
(74) *Attorney, Agent, or Firm* — Whitmyer IP Group LLC

(57) ABSTRACT

A system and method for transformation of motor transportation vehicle for ground and air transport, motor transportation vehicle are disclosed. The motor transportation vehicle consists of the body with the cabin, the front and rear axles, an actuation system, wings, covers, and tail including the support and the tail surfaces, and for transformation of the motor transportation vehicle for air transport to the motor transportation vehicle for ground transport the following transformation steps are preformed: minimization of the wings footprint area by turning the wings around their horizontal axes, which axes run through the halves or near the halves of the wing widths; opening two body covers; turning the folded wings into the vertical position; turning the folded wings from the vertical position towards rear position around the horizontal axis perpendicular to the length of the motor transportation vehicle, followed by closing the body covers; tilting the support cover/covers out;

(Continued)

retracting the support/supports of the tail surfaces under the opened support covers; closing the support cover/covers.

20 Claims, 9 Drawing Sheets

(51) Int. Cl.
*B64C 35/00* (2006.01)
*B64C 37/00* (2006.01)

(58) Field of Classification Search
USPC .......................................................... 244/7 R
See application file for complete search history.

(56) References Cited

U.S. PATENT DOCUMENTS

| | | | |
|---|---|---|---|
| 6,086,014 A | 7/2000 | Bragg, Jr. | |
| 6,129,306 A * | 10/2000 | Pham | B60F 5/02 244/2 |
| 6,131,848 A * | 10/2000 | Crow | B64C 37/00 244/2 |
| 6,619,584 B1 * | 9/2003 | Haynes | B60F 5/02 244/2 |
| 6,978,970 B2 * | 12/2005 | Purcell, Jr. | B64C 3/56 244/49 |
| 11,027,584 B1 * | 6/2021 | Kiceniuk, Jr. | B60F 5/02 |
| 2003/0094536 A1 | 5/2003 | LaBiche | |
| 2011/0042507 A1 * | 2/2011 | Seiford, Sr. | B60F 5/02 244/2 |
| 2011/0163197 A1 | 7/2011 | Farrag | |
| 2011/0226174 A1 * | 9/2011 | Parks | B60F 5/02 114/313 |
| 2018/0297698 A1 * | 10/2018 | Dhall | B64C 11/28 |
| 2018/0312251 A1 * | 11/2018 | Petrov | B64C 27/28 |
| 2021/0094374 A1 * | 4/2021 | Hirabayashi | B60G 5/005 |

FOREIGN PATENT DOCUMENTS

| | | | | |
|---|---|---|---|---|
| DE | 202006017959 U1 | 3/2007 | | |
| EP | 3335915 A1 * | 6/2018 | ......... | B64C 13/0421 |
| GB | 578043 A * | 6/1946 | ............. | B64C 37/00 |
| GB | 605755 A * | 7/1948 | ............. | B64C 37/00 |
| SK | 288242 B6 | 2/2015 | | |
| WO | WO-2010012285 A2 * | 2/2010 | ............. | B64C 37/00 |
| WO | WO-2012018382 A2 * | 2/2012 | ............... | B64C 5/12 |
| WO | WO-2013159672 A1 * | 10/2013 | ............. | B64C 37/00 |
| WO | WO-2017136316 A1 * | 8/2017 | ............. | B64C 37/00 |
| WO | WO-2019021521 A1 * | 1/2019 | ............... | B64C 3/56 |
| WO | WO-2021090788 A1 * | 5/2021 | ............. | B64C 27/28 |

* cited by examiner

METHOD FOR TRANSFORMATION OF MOTOR TRANSPORTATION VEHICLE FOR GROUND AND AIR TRANSPORT, MOTOR TRANSPORTATION VEHICLE

TECHNICAL FIELD

The present teaching relates to a system and method of transformation of a motor transportation vehicle for ground and air transport with the possibility to land on the water surface.

BACKGROUND

US2011/0163197 A1 deals with a motor transportation vehicle suitable both as a road motor vehicle, and a plane. This transportation vehicle comprises two units which are inter-connectible. The first unit is road transportation means comprising at least one seat, and the second unit is a flying part, which forms a plane or a helicopter after its connection.

US2003/0094536A1 describes a car, which can fly, comprising the folding wings, wherein the outer side of the wing is to be laid on the inner part of the wing attached to the car, and after the folding the wings are gradually positioned into the bottom part of the flying car.

U.S. Pat. No. 6,086,014 describes a small plane having the wings, which can be longitudinally folded and turned to the storage position along the sides of the transportation vehicle in its rear part.

U.S. Pat. No. 6,131,848 describes one-seat three-wheel plane capable of the road driving as a four-wheel car, with longitudinally attached wing panels.

SK288242 describes a method for transformation of a hybrid transportation vehicle comprising the following steps, when transformed from a car to a plane: tilting of both entire wings from their longitudinal position around two vertical axis into the flying position; tilting of the flotation shutters from the front part of the wings; and the reduction of the front wheelbase.

The above combined road and flying transportation means suffer from several insufficiencies manifested either during the transformation from one type of the transportation means to the another one, or by the using on the road; for example, the transformed car can be too long or robust. In many cases such plane does not correspond to a full-fledged air-means.

The aim of this present teaching is to create such a transformable motor transportation vehicle, which length would be similar to the length of a common motor vehicle intended for ground operation. In the same time the aim of this present teaching is to provide a motor transportation vehicle being a full-fledged plane and capable of landing, taking-off, and moving also on the water surface.

SUMMARY

Said inefficiencies are largely remedied by the method of transformation of a motor transportation vehicle for ground and air transport with a possibility to land on a water surface and take off from the water surface. This motor transportation vehicle consists of a body with a cabin and pontoons, front and rear axles, at least one actuation system, wings, covers, and a tail comprising a support and tail surfaces. The basis of the transformation of the motor transportation vehicle for air transport to the motor transportation vehicle for ground transport comprises the following transformation steps:

minimization of the wings footprint area by turning the wings around their horizontal axes, which axes run through the halves or near the halves of the wing widths;

opening two body covers;

turning the folded wings into the vertical position;

turning the folded wings from the vertical position backwards around the horizontal axis perpendicular to the length of the motor transportation vehicle, followed by closing the body covers;

shortening the length of the transportation vehicle by retracting the support/supports of the tail surfaces; and the reversal transformation of the motor transportation vehicle for ground transport to the motor transportation vehicle for air transport includes the following transformation steps:

elongating the transportation vehicle by extending the support/supports of the tail surfaces;

opening two body covers;

lifting the folded wings into the vertical position;

turning the folded wings from the vertical position to the horizontal position and closing the body covers;

maximization of the wings footprint area by turning the wings around their horizontal axis, which axis runs through the halves or near the halves of the wing's width.

According to the preferred embodiment shortening the transportation vehicle length/elongation of the length of the transportation vehicle by retracting/extending the support(s) of the tail surfaces can follow after opening the supports cover(s), and the closing the supports cover(s) can follow after shortening/elongating the length of the transportation vehicle.

According to another embodiment the transformation step for transformation of the motor transportation vehicle for air transport to the motor transportation vehicle for ground transport can be tilting a driven propeller with a driving mechanism into the body. For the reverse transformation of the motor transportation vehicle from ground transport to the motor transportation vehicle for air transport it is advantageous to tilt the propeller with the driving mechanism from the body to its flying position.

According to another preferred embodiment taking-off tilting and landing tilting of the wings can follow after turning the folded wings into their horizontal position, closing the body covers and maximization of the wings footprint areas by their turning around their horizontal axis running through the halves or near the halves of the wing widths.

According to another preferred embodiment in the plane embodiment the lifting the front axle is enabled in the vertical direction for shortening the take-off track.

Unlocking the wings precedes the minimization of the wings' footprint area, and after maximization of the wings' footprint area follows securing the wings in their flying position.

Another subject of this present teaching is also a motor transportation vehicle for ground transport, air transport, and water transport with a possibility to land on and take-off from the water surface modified by the above method of transformation. It is based on comprising the body with the cabin, the side pontoons, front and rear axles, at least one actuation system connected with the front and rear axles via a drive shaft and a gearbox. The wings interconnected via the central part are arranged along the sides of the body. The wings are controlled by the first actuators, while each wing is adapted for the folding along its length in order to form approximately half of its footprint area, and turning around its vertical position to the position parallel with the length of the motor transportation vehicle. Furthermore, it comprises at least one driven propeller arranged in the rear part of the body, the body covers in the upper part of the body controlled by second actuators, and the tail comprising the tail surfaces and supports controlled by third actuators. All transformation movements are controlled by a software and appropriate assigned actuators, and all transformation mechanisms are reciprocal.

According to a preferred embodiment the front axle and the rear axle are independently adapted for lifting in the vertical direction. The central part connecting the wings is formed as tiltable and its movement is controlled by an actuator.

According to another embodiment, if the transportation vehicle comprises only one actuation system, this actuation system can be localized in the center of gravity or near the center of gravity of the motor transportation vehicle, i.e. in the central part of the body. Such arrangement is suitable for a two-seat transportation vehicle.

In case of a four-seat transportation vehicle, it is advantageous to have the actuator system localized in the front part of the body.

According to another embodiment the motor transportation vehicle of the present teaching can comprise two actuation systems.

The supports of the tail surfaces are adapted for the translation movement or rotation-translation movement for shortening/extending the motor transportation vehicle. In the car embodiment the supports of the tail surfaces can be retracted under the supports covers arranged in the rear part of the side pontoons.

According to another preferred embodiment the side pontoons of the motor transportation vehicle for ground and air transportation can be adapted for exchanging for the side pontoons having a boat shape and vice versa. In such case it is advantageous to have the front and rear axles adapted for retracting into the side pontoons.

The longitudinal section of the body has a flying profile shape, in order to provide buoyancy. Therefore it will significantly contribute to the overall balance of the buoyancy force. In the basic embodiment with one actuation system the side pontoons are shaped in such a way to cover the front axle and the rear axle, and to minimize aerodynamic resistance due their shape. They also include the mechanisms for extending the tail outside, which mechanisms consist of the support and the tail surface.

According to one embodiment the tail surfaces are carried by the support of the tail surface consisting of two parts. Therefore, if the support consists of two parts, then the one, the tail surface is attached to, performs the translation movement upon which the front part of the support is shifted only by the movement bound to the shiftable position, but it is connected with the second part of the support, which second part performs the rotation movement.

According to another embodiment, if the support consists of only one part, this part performs only the translation extension movement. In such case the support is guided by bearing formed only by pulleys.

The pontoons can include also the supports covers surrounded and controlled by the actuators. If the pontoons have to be used for landing or taking-off from the water surface, they can have the bottom part in the form enabling the movement on water, similar to the plane floats. In such case the front and the rear axles are retracted in the floats outlines, and in case of ground movement the front and rear axles can be extended from the pontoons outline.

The wing is the main source of the buoyancy force. The wing is understood as a wing of classical arrangement, i.e. equipped with the little wings and a flotation shutter of a turning type or the shutter with a slot. According to the present teaching the wing is supplemented with two supports upon the entire span, which supports are connected in their upper, or in some cases in their lower parts via a pivotal joint. These two supports are connected via the securing mechanism enabling either their strong connection in the case of the flying configuration—plane, or their disconnection in the case when transformation to the configuration for ground transport—car, is needed.

The wings are mutually connected by a central part, which is the part of the body and is tilt-able. The actuator performs its tilting down. In relation to the central part the wings are positioned in the direction of the vehicle axis. A pair of actuators provides their lifting.

The body is equipped also with the body covers, which are tilted out and their movement is provided by the actuators.

The key element of this present teaching is the main transformation from a car mode vehicle to a plane mode vehicle.

The transformation is controlled by a specific software controlling also mutually coordinated movements of the actuators controlling the above described parts. The first movement is unlocking of the wing and the turning over approximately of the half of the rear part of the wing together with the flaps and a little wing around the pivotal bearing connecting the auxiliary wing supports. This movement significantly reduces the wing footprint area. At the same time the opening the body covers is performed. The subsequent movement is lifting the wing along the longitudinal axis of the motor vehicle to the vertical position. At the same time, however, also the tilting of the central part is initiated, and the whole wing system is gradually turned to the horizontal position along the vehicle. This wing position is the final one and it is characteristic for the car embodiment.

The retraction of the tail is the last movement. If the support for the tail surfaces is constructed as the rotation-translation mechanism, firstly it is necessary to open the supports covers. Subsequently, the actuator performs rotation and then retracts the tail surface to the position corresponding to the car embodiment. If the support of the tail surfaces is constructed only for the translation movement, the support cover is not needed.

Also auxiliary and additional movements are important. For the shortening of the taking-off track the lifting of the front axle is enabled, which lifting results in increasing the angle of the wing rise leading to a configuration favorable for the increase of the wing buoyancy. The concept, where the propeller is placed in the rear part of the body, enables its tilting into the body and consequently elimination of the safety concerns associated with the sharp edges in the road traffic.

The basic concept of this motor vehicle is represented by the two-seat cabin and the actuation system placed approximately in the center of gravity of the transportation vehicle behind the pilot cabin and the propeller in the pushing arrangement. The tail surfaces are formed by a pair of directional rudders and one elevation rudder.

Another embodiment is represented by the four-seat transportation vehicle having the actuation system shifted to the front part of the body. Shifting of the actuation system created a space for placing other staff members. In this case the propeller is connected with the actuation system via long drive shafts. The tail surfaces and the wing transformation remain unchanged.

Other embodiments are represented by the two-motor version employing the possibility to place two independent actuation systems into the middle parts of the pontoons. The propellers are positioned in the rear parts of the pontoons. In this case the tail surfaces are reduced to one directional and elevation rudder positioned in the axis of the vehicle symmetry. The methods for their extending are identical as in the previous embodiments.

A versatile version is another embodiment. It is formed by the body and specially shaped side pontoons with the retractile front and rear axles.

The advantage of this solution of the present teaching is the fact that the body is able to generate buoyancy, because it is constructed as a buoyancy entity. The wing transformation is designed to protect the wings by the side pontoons in the car modus. From the design point of view such solution enables to form the geometry close to the geometry of the sport cars. The retraction of the tail, either by the translation movement, or by the rotation-translation movement enables the shortening of the vehicle's length to the length common in the automotive field. On the other hand, the concept of the extending tail surfaces enables enlargement of the arm of the tail surfaces and consequently the significant improvement of the stability properties in the flying modus. The geometry of the arrangement of the front and rear axle (wheelbase) enables to achieve the full-fledged car characteristics. Positioning of the rear axle near the center of the gravity enables better body rotation in the take-off regime. The modularity opens the possibilities for easier realization and the preparation of the modifications as the prerequisite for the creating of integrated type series. A multi-engine version provides a possibility to be used also in the commercial operation of the air transport in an air-taxi segment.

BRIEF DESCRIPTION OF THE DRAWINGS

On the attached drawings, FIGS. 1 to 5 schematically show the motor transportation vehicle with one motor according to this present teaching in both embodiments, i.e. in the form of the car and in the form of the plane, as well as the individual steps for transformation from the plane to the car.

DETAILED DESCRIPTION

Example 1

Figure 1:
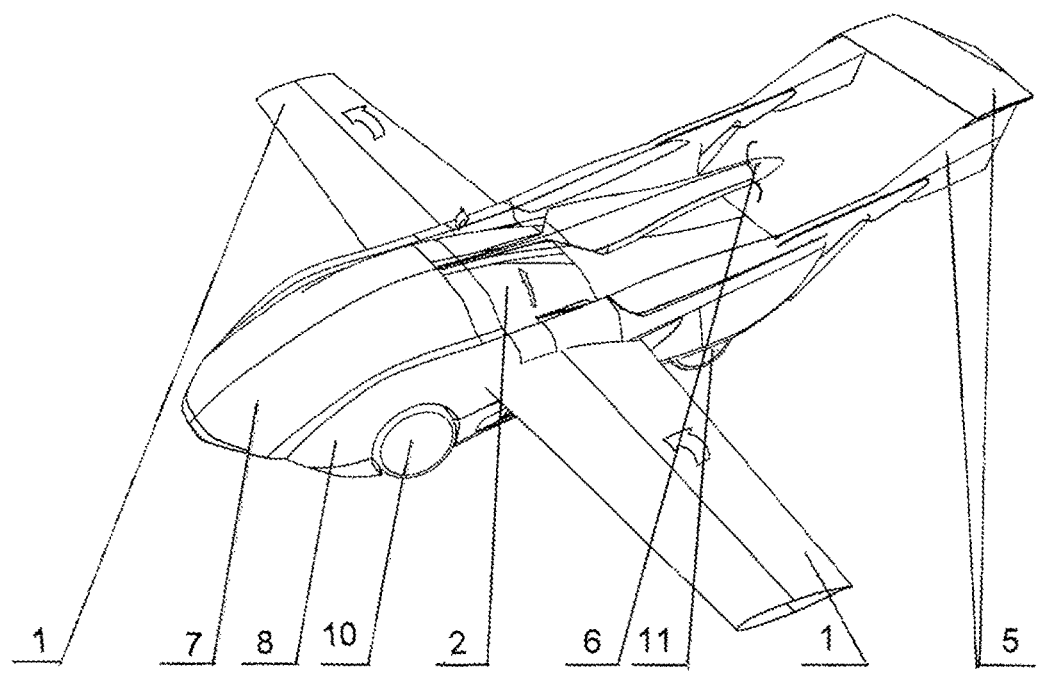
FIG. 1 shows the motor transportation vehicle in its plane embodiment.

The motor transportation vehicle illustrated in FIGS. 1 to 5 consists of the body 7 with cabin. The longitudinal section of the body 7 has a flying profile shape, in order to provide buoyancy. Therefore, it will significantly contribute to the overall balance of the buoyancy force.

The body 7 includes the cabin for the staff, and in case of one-motor version, i.e. the version with one actuation system 9, also the actuation system 9. The side pontoons 8 are symmetrically attached to the body 7 equipped with the body covers 8 at its upper part. In the basic here presented one-motor version the pontoons are shaped in such a way to cover the front axle 10 and the rear axle 11, and to minimize aerodynamic resistance due their shape. In the same time the mechanisms for the tail extending consisting of the supports 4 and the tail surfaces 5 are installed therein. The pontoons 8 comprise also the covers 3 of the supports, which are opened and controlled by the actuators. Actuators control also the supports covers 2, as well as all transformation movements of the wings 1 and tail.

Figure 2:
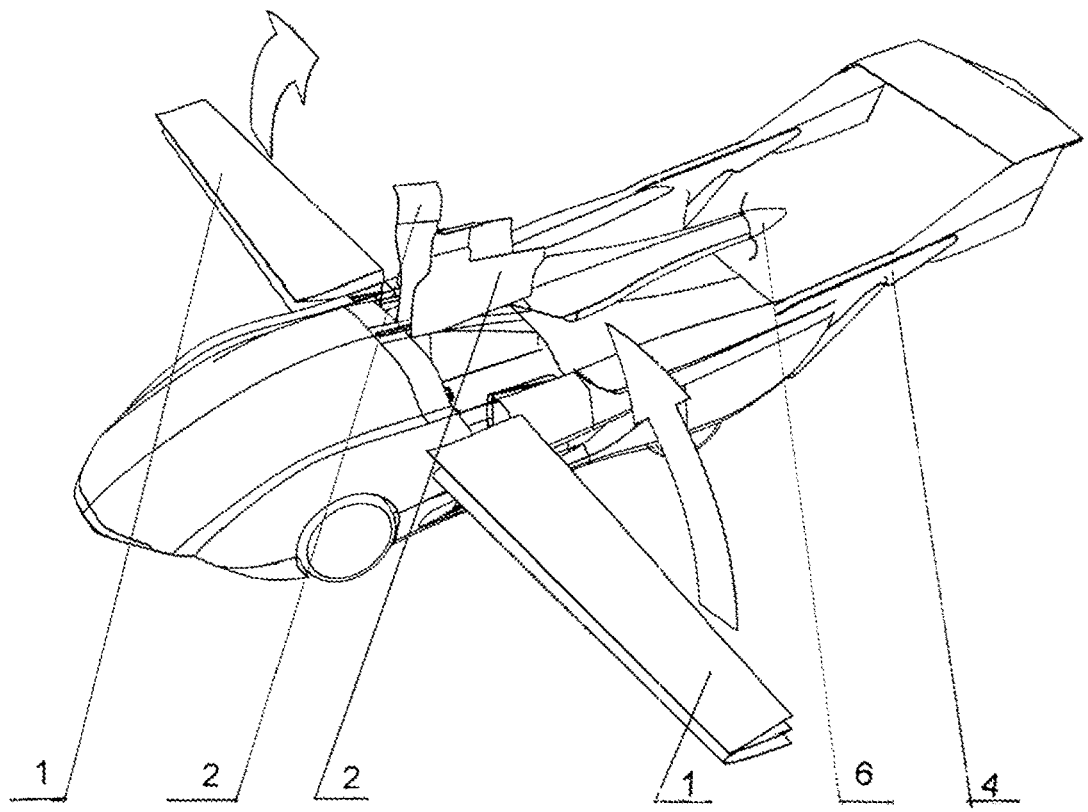
FIG. 2 shows the motor transportation vehicle in its plane embodiment after the first and second transformation steps.
Figure 3:
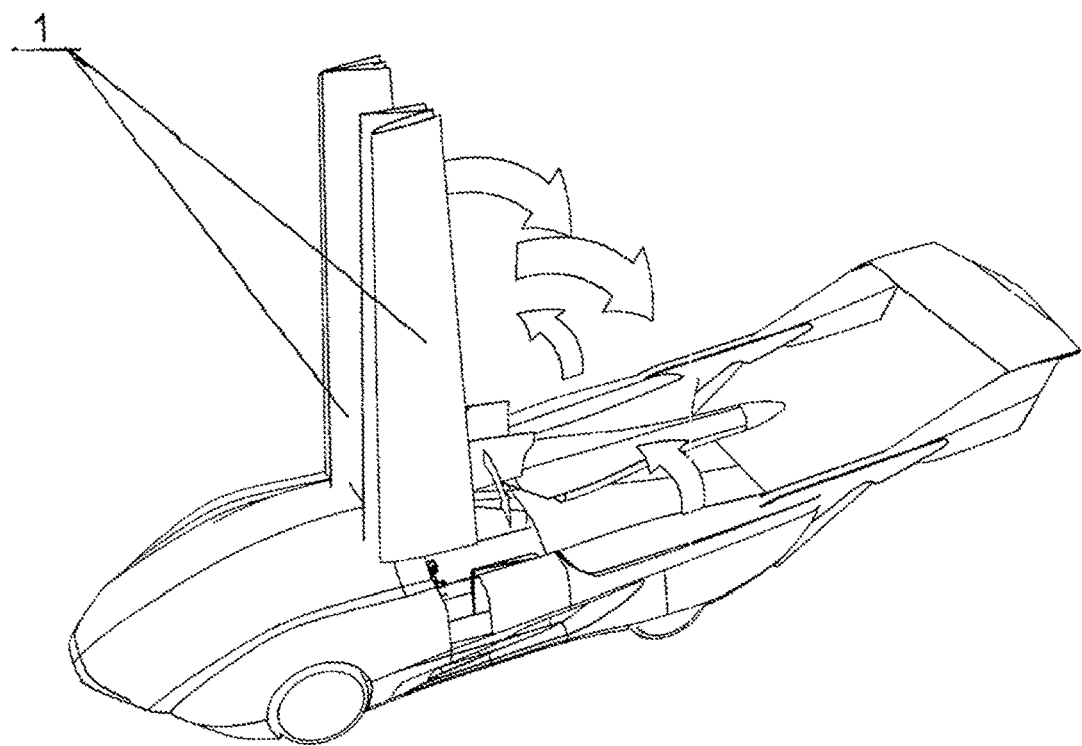
FIG. 3 shows the motor transportation vehicle in its plane embodiment after the is third transformation step.
Figure 4:
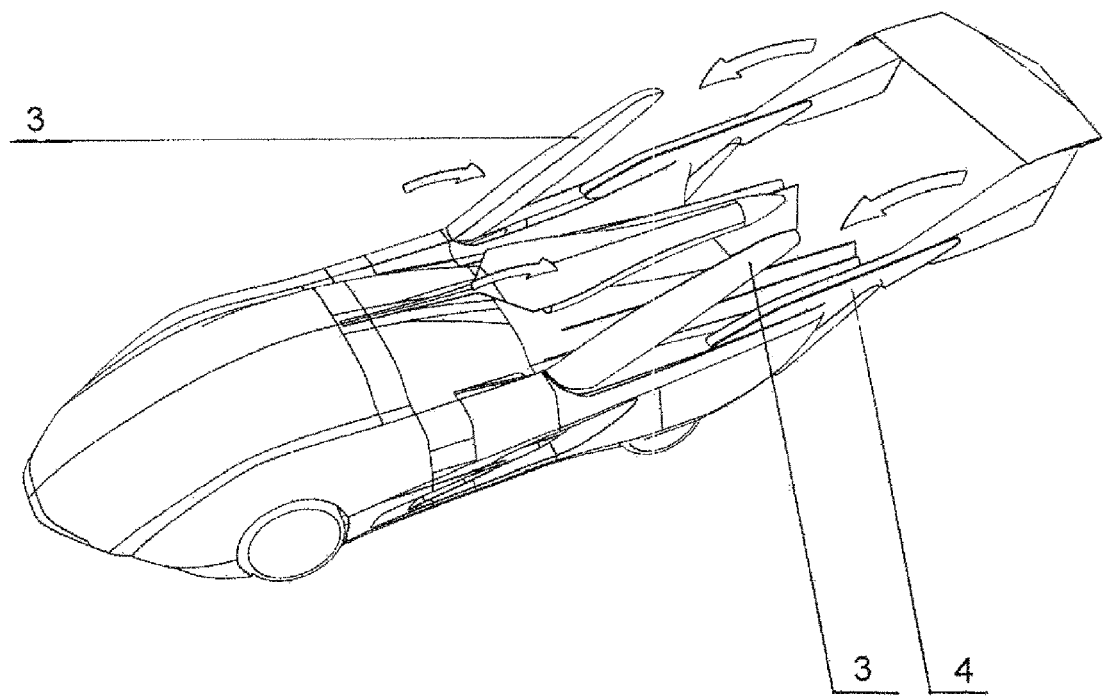
FIG. 4 shows the motor transportation vehicle at the fourth transformation step.
Figure 5:
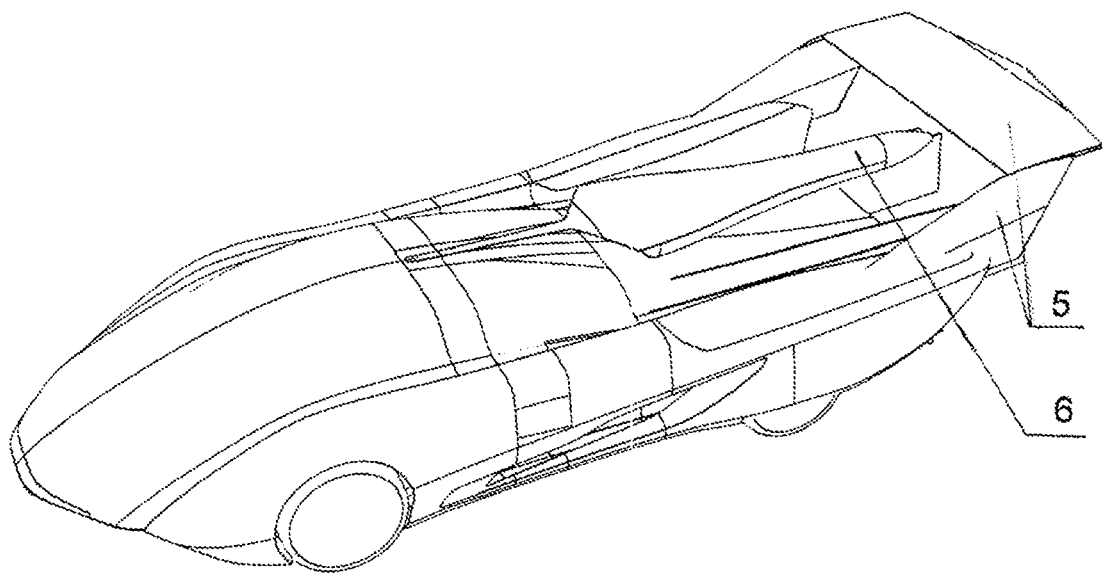
FIG. 5 represents the motor transportation vehicle after its transformation to the car.
Figure 12:
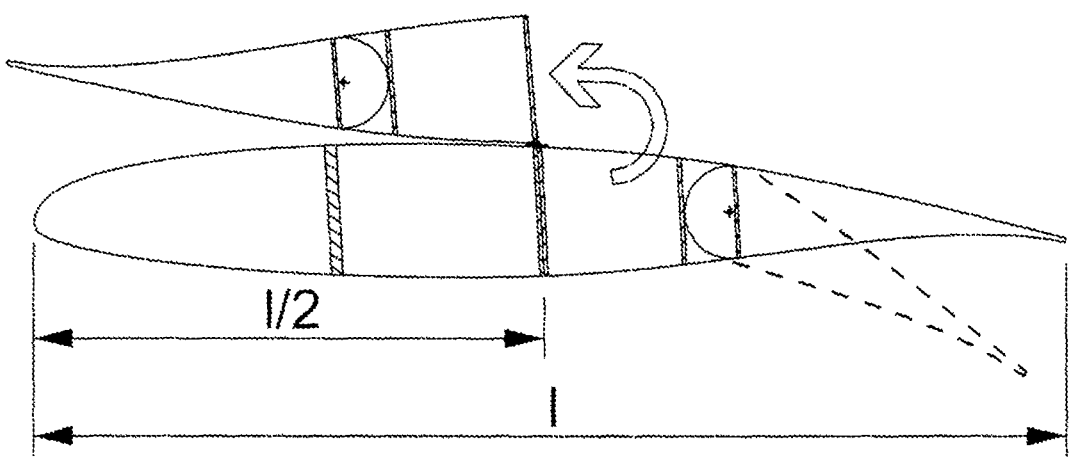
FIG. 12 shows the detailed view of the wing footprint area minimization.

FIG. 1 shows the motor transportation vehicle in its plane embodiment. In FIG. 2 so you can see the first transformation step from the plane embodiment to the car embodiment, particularly the lifting of the body covers 2 and the minimization of the wings' 1 footprint areas. The detailed minimization of the wing's footprint area is illustrated in FIG. 12, where it can be seen that the wing is divided into two parts approximately in the half of its width, so that the wing's rear part together with the flaps and a little wing turns over around the pivotal bearing connecting the auxiliary supports of the wing 1. Unlike the common wing, this wing comprises two additional supports in its entire span, which supports are interconnected in their upper or also in some cases in lower parts via a rotary joint enabling the minimization of the footprint area. These two supports are connected via the securing mechanism enabling either their strong connection in the case of the flying configuration—plane, or their disconnection in the case when the transformation to the configuration for ground transport—car, is needed. FIG. 3 shows the lifting of the folded wings to the vertical position, and the arrows indicate their subsequent turning backwards parallel with the longitudinal axis of the transportation vehicle.

The subsequent transformation step resides in the shortening of the transportation vehicle to the length of a common car. It is accomplished by the retracting the supports 4 of the tail surfaces 5 into the pontoons 8. The supports 4 of the tail surfaces 5 are slid into the support covers 3 after their opening.

The last step of the transformation of the one-motor plane to the car (FIG. 5) is the tilting of the driven propeller 6 into the body 7.

The transformation is controlled by specific software controlling also the mutually coordinated movements of the actuators controlling the above described parts of the motor transportation vehicle.

Example 2

Figure 15:
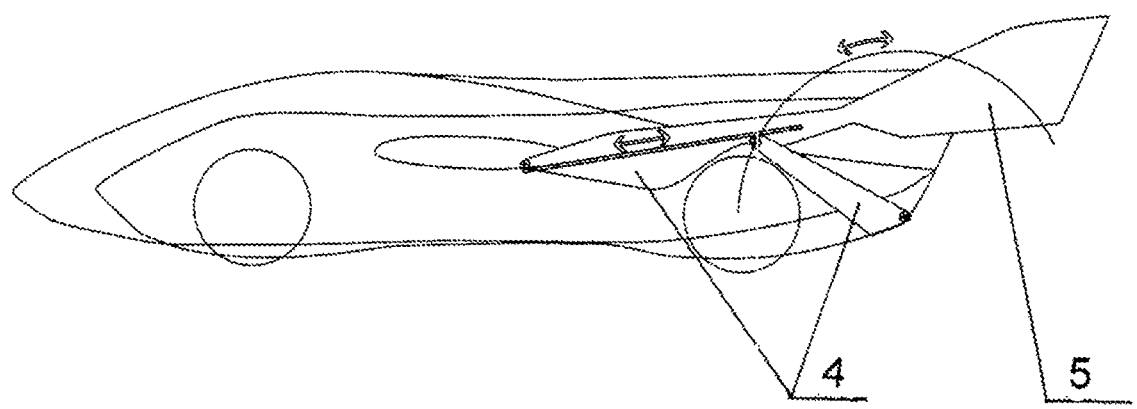
FIGS. 15, 16, and 17 schematically show the rotation-translation method for extending and retracting of the support(s) of the tail surfaces under the support covers.
Figure 16:
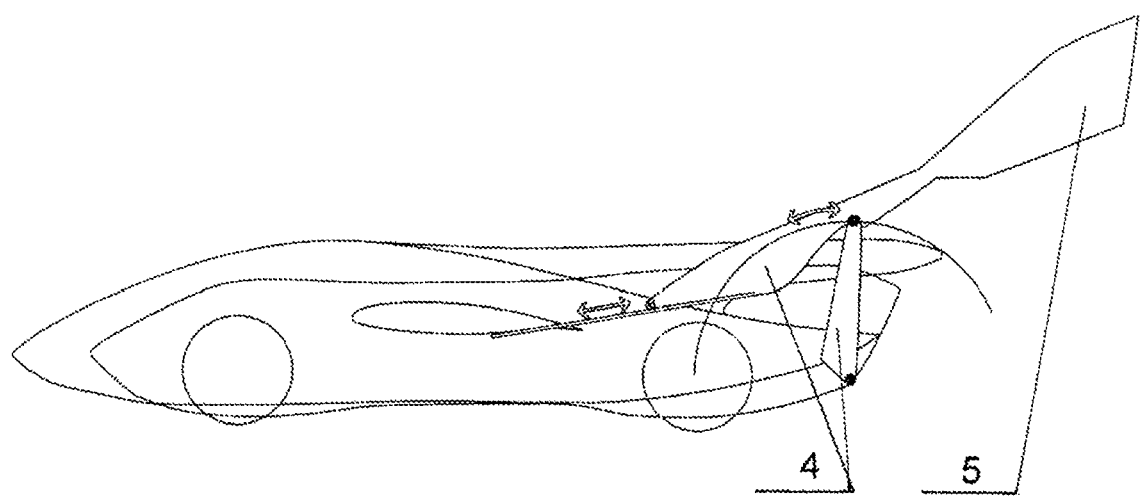
Figure 17:
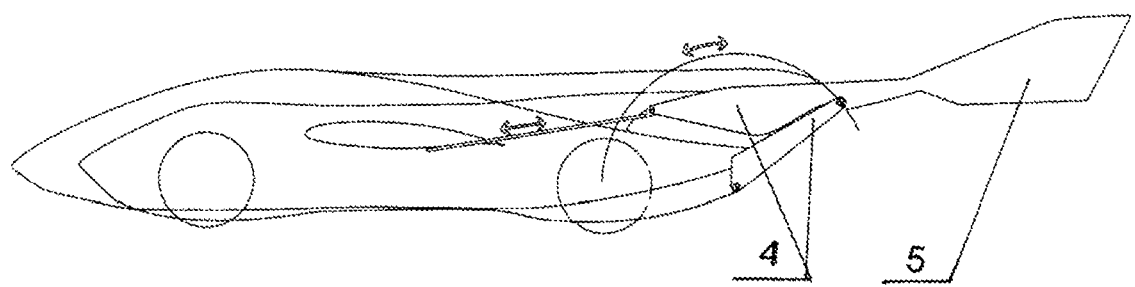

For the motor transportation embodiment illustrated in FIGS. 1 to 5, where the tail surfaces 5 are formed by a pair of direction rudders and one elevation rudder, it is suitable to use the shortening/extending of the overall length of the motor vehicle illustrated in FIGS. 15 to 17. The tail surfaces 5 are carried by the support 4 of the tail surface 5 consisting of two parts. Therefore, if the support consists of two parts, than the one, on which also the tail surface 5 itself is attached, performs the translation movement, wherein the front part of the support is shifted only via the movement associated with the shifting arrangement, but it is connected with the second part of the support, which second part performs only the rotation movement, as illustrated in FIGS. 15, 16, and 17, whereas FIG. 15 shows the car with the support 4 retracted under the support cover 3, and FIG. 17 illustrates the same motor vehicle in its plane embodiment.

Example 3

Figure 6:
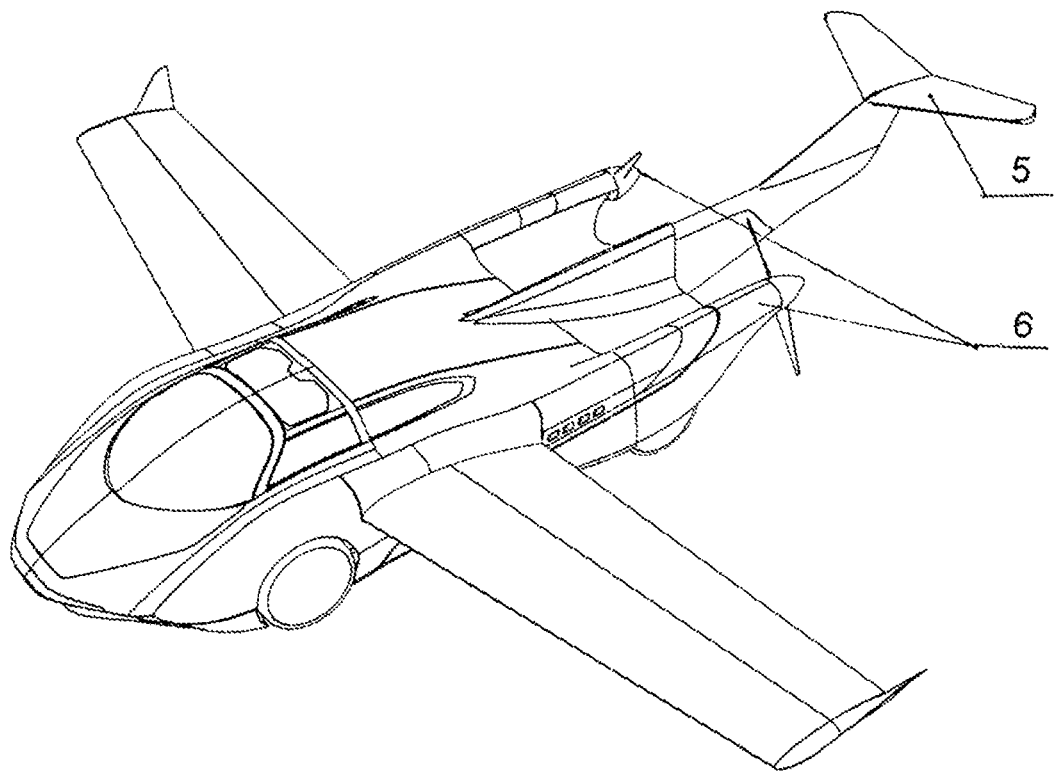
FIG. 6 shows the motor transportation vehicle according to the present teaching with two engines in its plane embodiment.

FIG. 6 shows the motor transportation vehicle in its plane embodiment having two actuation systems, and therefor with two driven propellers 6.

Figure 7:
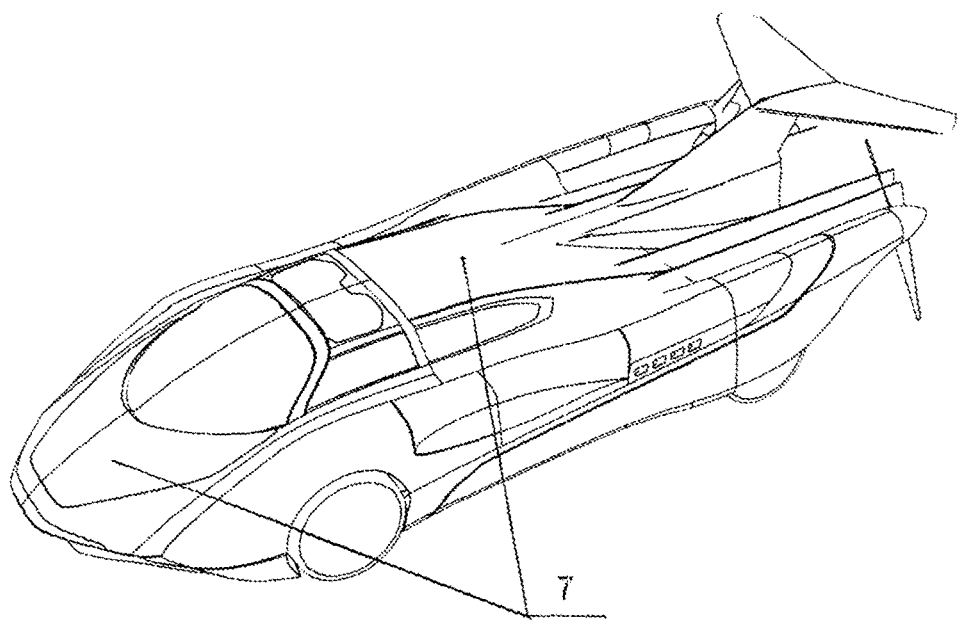
FIG. 7 shows the motor transportation vehicle according to the present teaching with two engines in its car embodiment.

FIG. 7 shows the same motor transportation vehicle after its transformation to the car embodiment. Unlike the transformation of the motor transportation vehicle as illustrated in FIGS. 1 to 5, in this case the transportation vehicle comprises only one support 4 of the tail surfaces 5, which support is arranged in the middle of the body 7 end. In this case the tail surfaces 5 are reduced to one directional and elevation rudder positioned in the axis of the vehicle symmetry.

Figure 13:
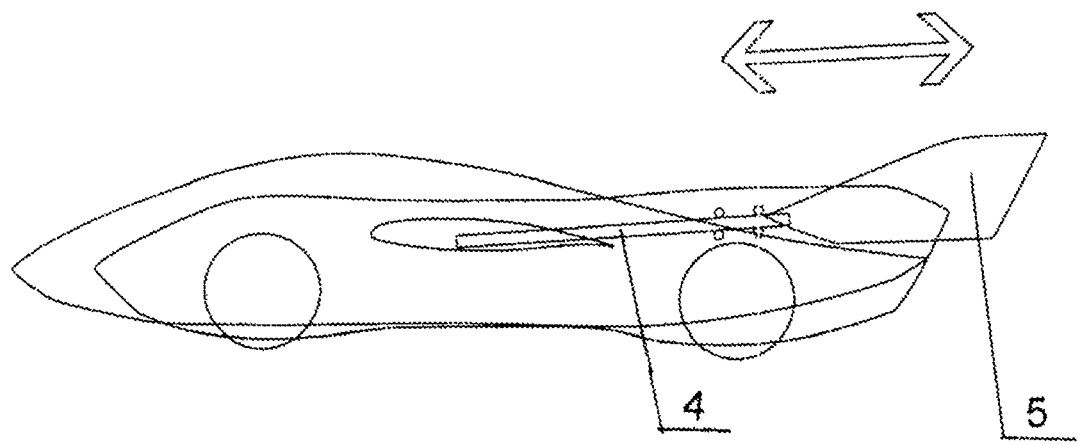
FIGS. 13 and 14 schematically show the translation movement of extending and retracting of the support(s) of the tail surfaces.
Figure 14:
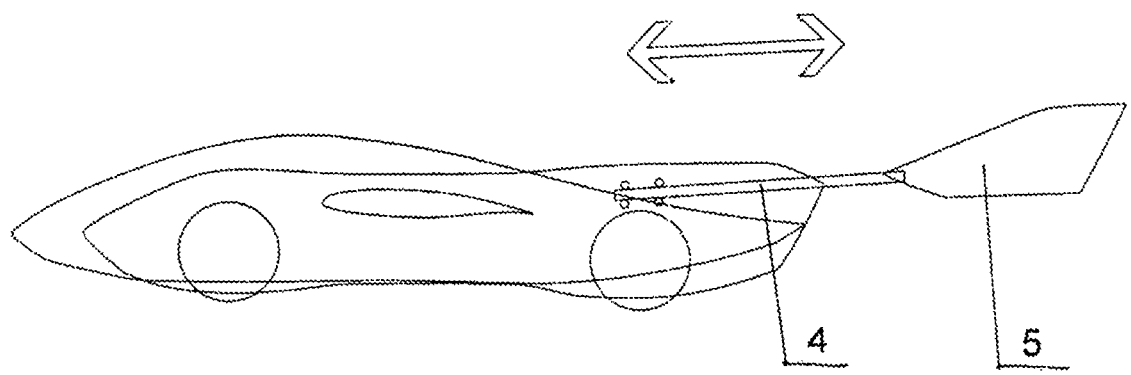

In this case it is preferred to have the support 4 of the tail surfaces constructed as one-part, and such support performs only the translation movement as illustrated in FIGS. 13 and 14. In such case a support cover 3 is not necessary.

FIG. 7 illustrates the support 4 of the tail surfaces fully retracted in the body 7.

Example 4

Figure 8:
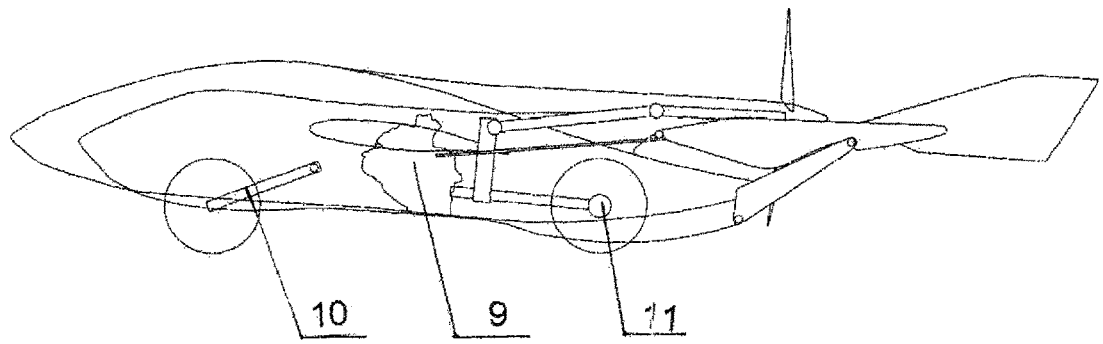
FIG. 8 shows the motor transportation vehicle according to the present teaching in its plane embodiment in the side view.

FIG. 8 shows the motor transportation vehicle in its plane embodiment. The construction of the front axle 10 enables the lift and thus the increasing of the angle of the wings 1 slope, being the favorable configuration for the increasing of the 1 wings' buoyancy and the shortening of the taking-off track. The actuation system 9 is placed in the middle part of the body, i.e. near the center of the vehicle gravity.

Example 5

Figure 9:
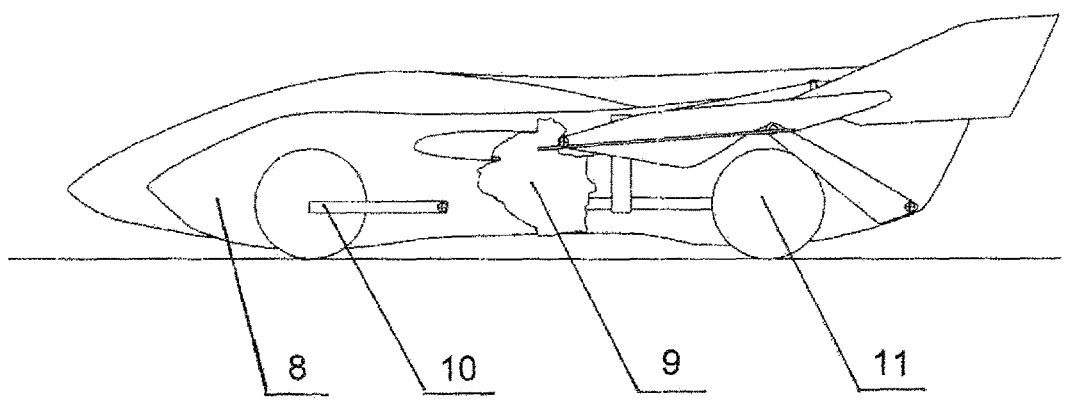
FIG. 9 shows the motor transportation vehicle according to the present teaching in its car embodiment.

FIG. 9 shows the same motor transportation vehicle as FIG. 8. The figures differ only in that FIG. 9 illustrates the car embodiment after the transformation. The front axle 10 is not lifted and the actuator system 9 is also placed in the middle part of the body.

This transportation vehicle, as illustrated in FIGS. 8 and 9, comprises two-seat cabin it its body.

Example 6

Figure 10:
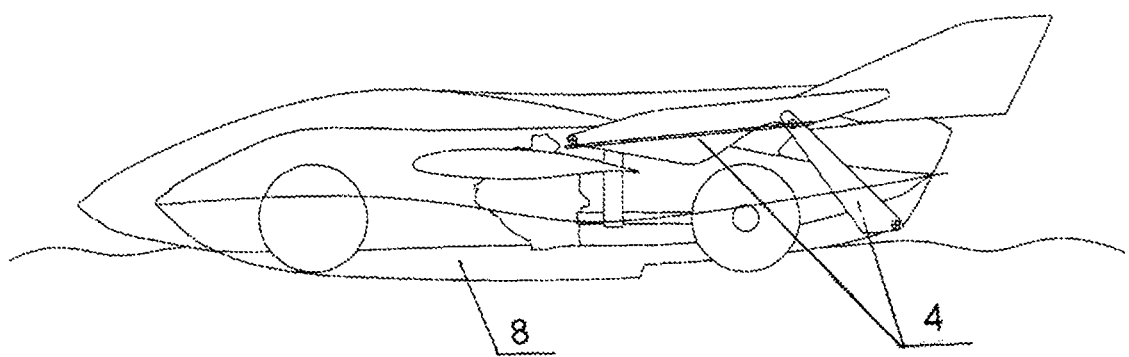
FIG. 10 shows the motor transportation vehicle according to the present teaching in its car embodiment with the possibility of the water transportation.
Figure 11:
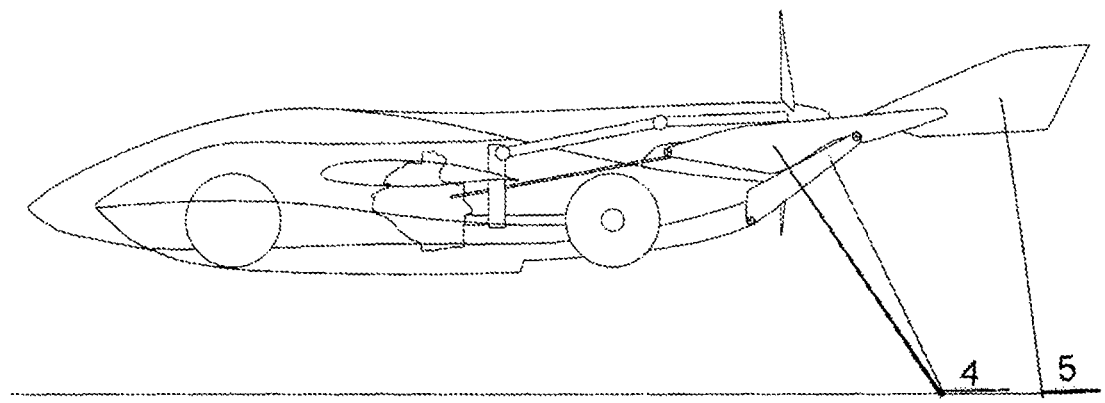
FIG. 11 shows the motor transportation vehicle according to the present teaching in its plane embodiment with the possibility of landing on the water surface and taking off from the water surface.

FIGS. 10 and 11 show the motor transportation vehicle having the pontoons 8 substituted by the specially shaped pontoons 8 similar to the bottom part of a boat. In this embodiment the front axle 10 and the rear axle 11 are retracted in the body 7. If needed, it is possible to use also water and the pontoons having their bottom part formed for the movement on water as the plane pontoons for the movement of this transportation vehicle. In such case the front and the rear axles are retracted in the floats outlines, and in case of ground movement the front axle 10 and rear axle 11 can be extended from the pontoons 8 outline.

Example 7

Figure 18:
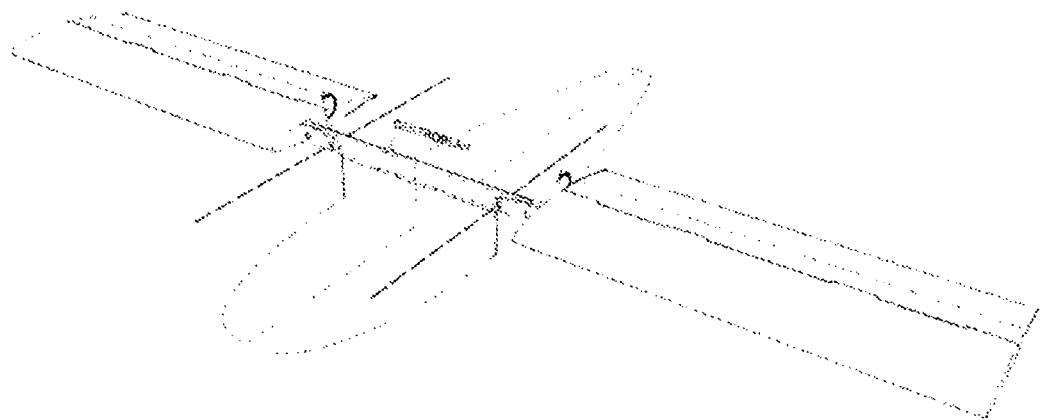
FIGS. 18, 19, 20, and 21 schematically show the steps for the transformation of the wings and their securing on the central part.
Figure 19:
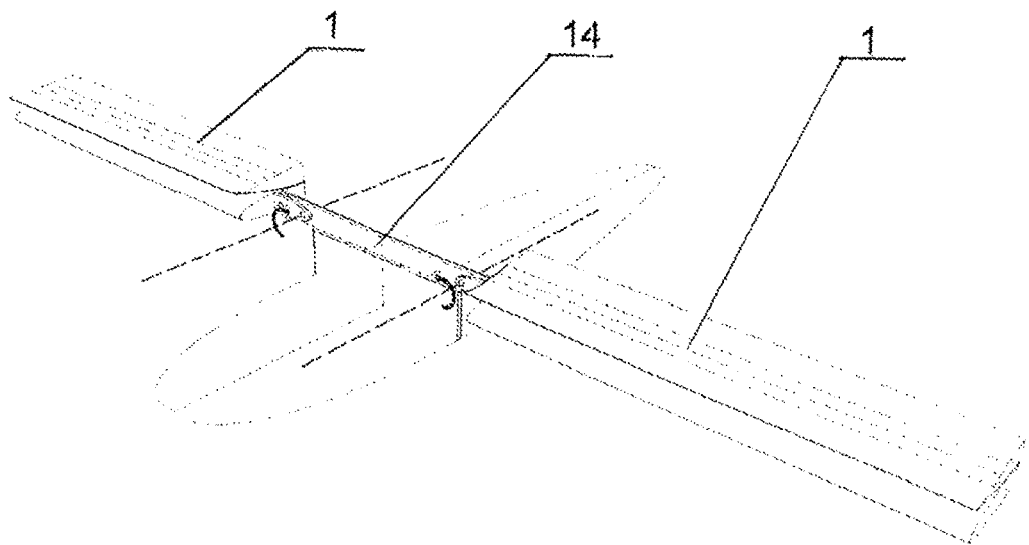
Figure 20:
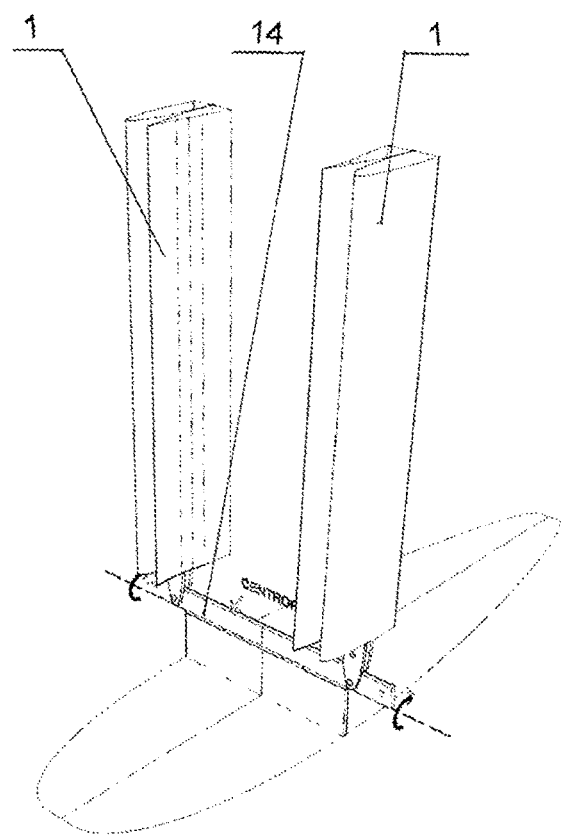
Figure 21:
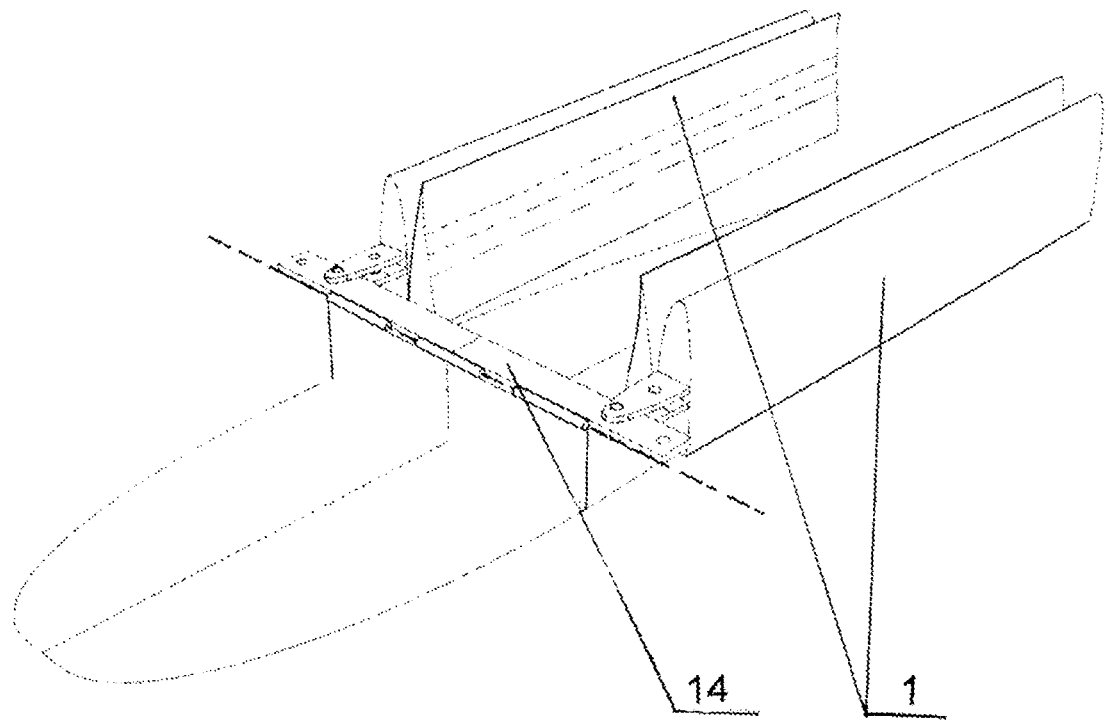

FIGS. 17 to 21 show transformation of the central part 14 with the wings 1. The wings 1 are mutually connected by the central part 14, which is the part of the body 7 and is tiltable. Tilting of the central part 14 is performed by the actuator, which is not illustrated in the figures. FIG. 18 shows the wings in the plane embodiment, similarly as in FIG. 1. The wing transformation illustrated in FIG. 19 corresponds to the transformation illustrated in FIG. 2, and FIG. 20 corresponds to the wing transformation in FIG. 3. FIG. 21 illustrates the tilted central part 14 and this figure corresponds to the wing position illustrated in FIG. 5.

Example 8

Figure 22:
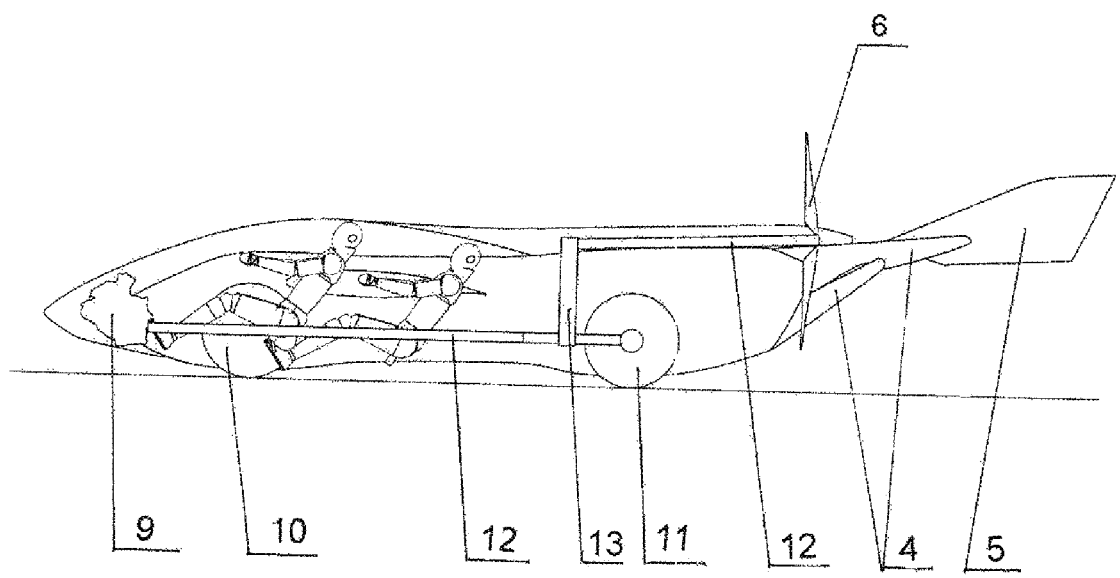
FIG. 22 shows the arrangement of the actuator unit for the four-seat cabin.

FIG. 22 shows another embodiment of the motor transportation vehicle of the present teaching. It illustrates the four-seat transportation vehicle having the actuation system 9 placed in the front part of the body 7. The shifting of the actuation system 9 created a space for placing other staff members 2. In this case the driven propeller 6 is connected with the actuation system 9 via long drive shafts 12. The transformation of the length of the motor transportation vehicle and the transformation of the wings 1 remain unchanged.

The invention claimed is:
1. A method of transformation of a motor transportation vehicle for ground transport and air transport, wherein the motor transportation vehicle includes a body with a cabin and side pontoons, a front axle and a rear axle, at least one actuation system, wings supplemented with two auxiliary supports upon the entire span, which supports are connected in their upper or their lower parts via a pivotal joint and wherein the wing is divided into two parts approximately in the half of its width, covers, and a tail including supports and tail surfaces, wherein it includes the following transformation steps for transformation of the motor transportation vehicle for air transport to the motor transportation vehicle for ground transport:
minimization of the wings footprint areas by turning wing's rear part together with the flaps and a little wing around the pivotal bearing connecting the auxiliary wing supports around their horizontal axes, which axes run through the halves or near the halves of the wing widths;

opening the body covers;

turning the folded wings into a vertical position;

turning the folded wings from the vertical position backwards around the horizontal axis perpendicular to the length of the motor transportation vehicle, followed by closing the body covers;

shortening the length of the motor transportation vehicle by retracting the support/supports of the tail surfaces; and the reversal transformation of the motor transportation vehicle for ground transport to the motor transportation vehicle for air transport includes the following transformation steps:

elongating the length of the motor transportation vehicle by extending the support/supports of the tail surfaces;

opening two body covers;

lifting the folded wings into the vertical position;

turning the folded wings from the vertical position to the horizontal position and closing the body covers;

the reversal maximization of the wings footprint areas.

2. The method of transformation according to claim 1, wherein opening the body covers precedes shortening elongating the length of the transportation vehicle by retracting/extending the support(s) of the tail surfaces, and after shortening/extending the length of the transportation vehicle closing the body covers follows.

3. The method according to claim 1, wherein a further transformation step for transformation of the motor transportation vehicle for air transport to the motor transportation vehicle for ground transport comprises: folding a propeller with a driving mechanism into the body.

4. The method according to claim 1, wherein a further transformation step for transformation of the motor transportation vehicle for ground transport to the motor transportation vehicle for air transport comprises: tilting a propeller with a driving mechanism from the body to its flying position.

5. The method according to claim 1, wherein turning the folded wings into their horizontal position, closing the body covers, and maximization of the wings' footprint areas is followed by taking-off and landing tilting of the wings.

6. The method according to claim 1, wherein it further includes lifting the front axle in the vertical direction in order to shorten a take-off track.

7. The method according to claim 1, wherein unlocking the wings precedes minimization of the wings footprint areas.

8. The method according to claim 1, wherein the maximization of the wings' footprint areas is followed by locking the wings in their flying position.

9. A motor transportation vehicle for ground transport, air transport and transport on a water surface with a possibility to land on and take-off from the water surface, adapted for transformation by the method according to claim 1, wherein, it includes a body with a cabin, side pontoons, a front axle and a rear axle, at least one actuation system interconnected with the front axle and the rear axle via drive shafts and a gearbox, wings arranged at the sides and connected by the central part, wherein the wings are controlled by first actuators, wherein each wing is adapted for folding along its length in order to form approximately the half of its original surface and for its turning through the vertical position into the position parallel with the length of the motor transportation vehicle; at least one propeller with a driving mechanism arranged in the rear part of the body, body covers in the upper part of the body controlled by second actuators, and a tail including tail surfaces and supports controlled by third actuators, wherein all transformation movements are controlled via software and by corresponding assigned actuators, and all transformation mechanisms are reciprocal.

10. The motor transportation vehicle according to claim 9, wherein the front axle and the rear axle are independently adapted for lifting in a vertical direction.

11. The motor transportation vehicle according to claim 9, wherein the central part is formed as tiltable and its movement is controlled by an actuator.

12. The motor transportation vehicle according to claim 9, wherein the actuation system is placed in the center of gravity or near the center of gravity of the motor transportation vehicle.

13. The motor transportation vehicle according to claim 9, wherein the actuation system is positioned in the front part of the body.

14. The motor transportation vehicle according to claim 9, wherein it includes two actuation systems.

15. The motor transportation vehicle according to claim 9, wherein the supports of the tail surfaces are adapted for the translation movement or rotation-translation movement at shortening/elongating the motor transportation vehicle.

16. The motor transportation vehicle according to claim 9, wherein it further includes support covers.

17. The motor transportation vehicle according to claim 9, wherein the side pontoons of the motor transportation vehicle for ground and air transport are adapted for exchanging for the side pontoons having a boat shape and vice versa.

18. The motor transportation vehicle according to claim 9, wherein the front axle and the rear axle are adapted for retracting into the pontoons.

19. The motor transportation vehicle according to claim 9, wherein the cabin in the body has two seats.

20. The motor transportation vehicle according to claim 9, wherein the cabin in the body has four seats.

* * * * *